United States Patent [19]

Avny

[11] Patent Number: 4,712,449
[45] Date of Patent: Dec. 15, 1987

[54] APPARATUS FOR LIMITING DIFFERENTIAL ROTATION

[75] Inventor: Eli Avny, Rockford, Ill.

[73] Assignee: Sundstrand Corporation, Rockford, Ill.

[21] Appl. No.: 908,590

[22] Filed: Sep. 18, 1986

[51] Int. Cl.$^4$ .............................................. F16H 1/44
[52] U.S. Cl. ...................................... 74/710.5; 74/711
[58] Field of Search ............................ 74/710.5, 711

[56] References Cited

U.S. PATENT DOCUMENTS

| | | | |
|---|---|---|---|
| 781,825 | 2/1905 | Hedgeland | 192/50 |
| 1,341,276 | 5/1920 | MacDonald | 74/710.5 |
| 1,431,535 | 10/1922 | MacDonald | 74/710.5 |
| 1,868,254 | 7/1932 | Reaves | 192/47 |
| 2,077,253 | 4/1937 | Nardone | 192/48 |
| 2,268,601 | 1/1942 | Knox | 180/9.2 |
| 2,495,016 | 1/1950 | Mesick | 74/710.5 |
| 2,504,018 | 4/1950 | Gibson et al. | 192/48 |
| 2,630,024 | 3/1953 | Pontrello | 74/711 |
| 2,860,266 | 11/1958 | Schrader | 310/112 |
| 2,860,713 | 11/1958 | Peterson | 170/135.75 |
| 2,985,035 | 5/1961 | Toth | 74/711 |
| 3,106,997 | 10/1963 | White | 192/4 |
| 3,159,046 | 12/1964 | Harned et al. | 74/424.8 |
| 3,650,156 | 3/1972 | Thomas | 74/10.2 |
| 3,935,754 | 2/1976 | Comollo | 74/665 F |
| 4,004,471 | 1/1977 | Keske | 74/710.5 X |
| 4,143,747 | 3/1979 | Langieri, Jr. et al. | 192/89 W |
| 4,179,944 | 12/1979 | Conner | 74/89.15 |
| 4,248,105 | 2/1981 | Downing et al. | 74/710.5 |
| 4,273,006 | 6/1981 | Woodbury | 74/710.5 |
| 4,351,635 | 9/1982 | Staedeli | 440/75 |
| 4,441,675 | 4/1984 | Boehringer et al. | 244/213 |

FOREIGN PATENT DOCUMENTS

| 430128 | 2/1948 | Italy | 74/711 |
|---|---|---|---|
| 252934 | 10/1948 | Switzerland | 74/710.5 |

*Primary Examiner*—Leslie Braun
*Assistant Examiner*—Dirk Wright
*Attorney, Agent, or Firm*—Wood, Dalton, Phillips, Mason & Rowe

[57] ABSTRACT

An apparatus is provided for limiting the relative rotation between two drive members, including a differential having two input gears associated with the drive members, a carrier, and two coaxial differential gears carried by the carrier. One differential gear directly engages both input gears, while the other differential gear engages both input gears through idler gears. A threaded shaft is coaxially fixed to one of the differential gears and has a traveling nut thereon. A tubular shaft coaxially fixed to the other differential gear extends over the threaded shaft and has a spline connection with the traveling nut. Radially extending stops are provided on the threaded shaft and are adapted to engage axially extending tabs on the traveling nut when the drive members reach either selected limit of relative rotation.

10 Claims, 2 Drawing Figures

APPARATUS FOR LIMITING DIFFERENTIAL ROTATION

TECHNICAL FIELD

The present invention relates generally to limiting shaft rotation, and more particularly to an apparatus adapted to limit differential rotation of two shafts.

DESCRIPTION OF THE PRIOR ART

In many apparatuses having rotary drive members and the like, it is desirable to limit the differential rotation of two drive members which operate independently under normal conditions. For example, with flap actuation mechanisms where different motors drive the flaps on opposing wings of an aircraft, it is critical for safety that no more than a predetermined asymmetry between the flaps be allowed. In those cases where one of the motors fails, it is therefore critical that the operating motor drive the flaps on both wings.

There are in the prior art a number of structures which are responsive to an asymmetry between two rotating shafts. For example, U.S. Pat. No. 2,495,016 discloses a structure in which an automobile differential is locked by a traveling nut when selected asymmetry between two shafts is reached. Also, U.S. Pat. Nos. 4,441,675 and 3,935,754 disclose systems operable in response to asymmetry in aircraft craft flap actuators, the former having a shutoff valve responsive to any asymmetry and the latter having an electrical counter which measures asymmetry.

These prior art structures, however, either do not allow for large amounts of relative rotation (U.S. Pat. No. 4,441,675) or, if they do, require correspondingly large, and thus heavy, components (U.S. Pat. No. 2,495,016), a particular disadvantage in aircraft, or they do not provide the positive reliability of a directly acting mechanical structure (U.S. Pat. No. 3,935,754). The structure of U.S. Pat. No. 2,495,016 further is subject to high impact loads (increasing the danger of failure) and jams when the limit is reached.

The present invention is directed toward overcoming one or more of the problems as set forth above.

SUMMARY OF THE INVENTION

It is an object of the present invention to provide an apparatus which establishes limits to the relative rotation between shafts so as to transmit torque between shafts when the limits are reached. It is another aspect of the present invention to provide an apparatus which has low impact loads and allows the shafts to freely rotate relative to one another in the opposite direction after the limit in one direction is reached. Still another object of the present invention is to provide an apparatus which is compact and which further will allow for a large number of relative revolutions between selected travel limits.

In one aspect of the present invention, these objects are realized in an apparatus for limiting the relative rotation between two drive members, including a differential having two input gears associated with the drive members, a carrier, and two coaxial differential gears carried by the carrier. One differential gear directly engages both input gears, while the other differential gear engages both input gears through idler gears. A threaded shaft is coaxially fixed to one of the differential gears and has a traveling nut thereon. A tubular shaft coaxially fixed to the other differential gear extends over the threaded shaft and has a spline connection with the traveling nut. Radially extending stops are provided on the threaded shaft and are adapted to engage axially extending tabs on the traveling nut when the drive members reach either selected limit of relative rotation.

DESCRIPTION OF THE PREFERRED EMBODIMENT

Figure 1:
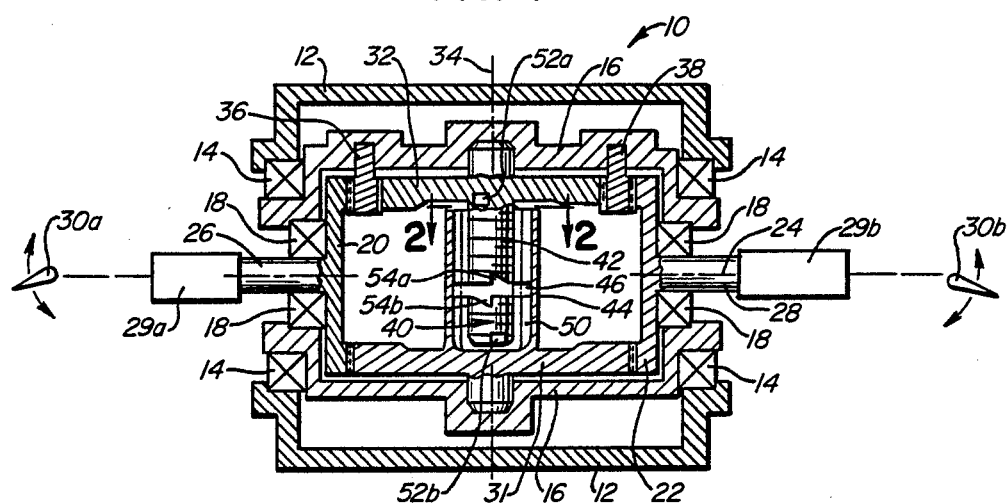
FIG. 1 is a cross-sectional view of the differential rotation limiting apparatus.

The differential rotation limiting apparatus 10 is shown in FIG. 1 having a housing 12 rotatably supporting (by suitable bearings indicated schematically at 14) a carrier 16.

The carrier 16 supports (as by the bearings indicated schematically at 18) a pair of input gears 20,22 for rotation about an axis 24. In the preferred embodiment, the input gears 20,22 are face gears as shown, though a person skilled in the art and with an understanding of the present invention would recognize that bevel gears could also be used.

The input gears 20,22 have drive shafts 26,28 which are drivably connected to two different drive members, such as the rotary drive members 29a,29b shown schematically for the actuators for the flaps 30a,30b on opposite wings of an aircraft.

The carrier 16 also carries with it two stop or differential gears 31,32, both of which are supported for rotation about an axis 34 substantially midway between the input gears 20,22 and which intersects and is perpendicular to the axis 24 of the input gears 20,22. Inasmuch as the carrier 16 rotates, the axis 34 of rotation of the stop gears 31,32 also rotates around the input gear axis 24.

One of the stop gears 31 directly engages both input gears 20,22. A pair of idler gears 36,38 rotatably carried by the carrier 16 are disposed between the other smaller, stop gear 32 and the input gears 20,22.

A shaft 40 having a helical thread 42 therearound is fixed to the smaller stop gear 32 and is received within a tubular shaft 44 fixed to the other stop gear 31.

Figure 2:
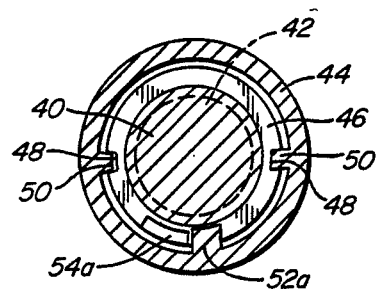
FIG. 2 is an enlarged cross-sectional view taken along line 2—2 of FIG. 1.

A traveling nut 46 is disposed over the threaded shaft 40 and is splined to the shaft 44 by a pair of slots 48 (see FIG. 2) receiving radially inwardly directed ribs 50 in the interior of the tubular shaft 44. As will be apparent to a skilled artisan having an understanding of the present invention, still other spline connections between the nut 46 and tubular shaft 44 would be suitable so long as they fix the nut 46 against relative rotation with respect to the tubular shaft 44 but still allow axial motion of the nut 46.

Radially projecting nut stops 52a,52b are provided on the threaded shaft 40 and axially extending tabs 54a,54b are provided on opposite sides of the nut 46. The tabs 54a, 54b engage the associated stops 52a,52b at selected limits of relative rotation as will become apparent from the discussion hereafter.

Operation of the apparatus 10 is as follows. When the two input gears 20,22 rotate at the same rate, the stop gears 31,32 do not rotate about their own axis 34 and the carrier 16 rotates at the same rate as the input gears 20, 22.

Should there be a relative rotation between the input gears 20,22 (if, e.g., the motor driving the drive member 29a or 29b on one flap actuator failed), the carrier 16 will rotate at a different rate and the stop gears 31,32 will be caused to rotate about their common axis 34. Since the idler gears 38 reverse the direction of rotation of the engaged stop gear 32, the stop gears 31,32 actually rotate in the same direction with the smaller stop gear 32 rotating at a slightly faster rate. The rate of relative rotation between the stop gears 31,32 is thus the difference in stop gear rotation rates rather than their sum.

This relative rotation between the stop gears 31, 32 causes the traveling nut 46 to be rotated about the threaded shaft 40 by the tubular shaft 44, and the nut 46 thereby is moved axially by the helical thread 42.

When the nut 46 reaches an axial position whereby one of its tabs 54a or 54b axially overlies one of the nut stops 52a or 52b, the tab 54a or 54b and stop 52a or 52b will engage to prevent further relative rotation in that direction and thereby transfer torque between the input gears 20,22 and associated drive members (so that, e.g., one motor would drive both flap actuators if the other motor had failed). Since the relative rotation rate of the shafts 40, 44 is minimized (being the difference in rates rather than the sum, as discussed above), the impact loads from the engagement of the stop 52a or 52b and tab 54a or 54b are also minimized.

Reversal of relative rotation of the input gears 20,22 will reverse the procedure, with the nut tab 54a or 54b freely rotating away from the stop 52a or 52b and the nut 46 traveling axially in the other direction until its other tab 54b or 54a engages the other stop 52b or 54a at the other limit of relative rotation.

This apparatus 10 thus provides limits on the relative rotation between drive members without jamming the apparatus 10, thereby allowing the drive members to freely rotate relative to one another in the opposite direction after the limit in one direction is reached (i.e. the nut 46, and thus the shafts 40,44, can freely back away from the limits). This compact apparatus 10 further permits establishment of travel limits with large numbers of revolutions therebetween (size being a particularly important factor in many applications such as aircrafts; for example, establishing limits which would allow only 1° difference in the flap configurations on opposite wings might require that several thousand relative revolutions of the drive members be allowed).

Still other aspects, objects and advantages of this invention can be obtained from a study of the drawings, the disclosure and the appended claims.

I claim:

1. An apparatus for limiting the relative rotation between two drive members, comprising:
    first and second coaxial input gears driven by respective drive members;
    a carrier adapted to rotate about the axis of the input gears;
    a first stop gear carried by said carrier for rotation about an axis substantially perpendicular to the input gear axis, said first stop gear drivably engaging said first and second input gears;
    a second stop gear coaxial with the first stop gear and rotatably carried by the carrier;
    first and second idler gears disposed between the second stop gear and the first and second input gears respectively;
    means for axially moving a traveling nut supported for axial movement between the first and second stop gears in response to differential rotation between the first and second stop gears; and
    means for limiting axial motion of the nut when the drive members are at a selected limit of relative rotation.

2. The limiting apparatus of claim 1, wherein the idler gears are rotatably carried by the carrier.

3. The limiting apparatus of claim 1, wherein the input gears are face gears.

4. The limiting apparatus of claim 1, wherein the moving means comprises:
    a first shaft fixed to and coaxial with one of the stop gears, said first shaft having a helical thread engaging the traveling nut;
    a second shaft fixed to and coaxial with the other of the stop gears, said second shaft further having a spline connection with the traveling nut;
    wherein one of said shafts is tubular and receives the other of said shafts therein.

5. The limiting apparatus of claim 4, wherein the first shaft helical thread engages a thread about the inner periphery of the traveling nut and the second shaft has a spline connection with the outer periphery of the traveling nut.

6. The limiting apparatus of claim 4, wherein the limiting means comprises radial projections from the first shaft and axially extending tabs from the traveling nut.

7. In an apparatus for limiting the relative rotation between two coaxial drive shafts interconnected by a differential having first and second input gears associated with the drive shafts, a carrier, and first and second coaxial differential gears carried by the carrier and each drivably associated with both input gears, the improvement comprising:
    idler gears carried by the carrier and disposed between the second differential gear and the first and second input gears;
    a traveling nut engaging a threaded shaft coaxially fixed to one of the differential gears;
    means for preventing rotation of the nut relative to the other of the differential gears; and
    means for limiting travel of the nut when the coaxial shafts are at a selected limit of relative rotation.

8. The limiting apparatus of claim 7, wherein the preventing means comprises a tubular shaft disposed over the threaded shaft and having a spline connection with the traveling nut.

9. The limiting apparatus of claim 7, wherein the limiting means comprise radial projections from the threaded shaft and axially extending tabs from the traveling nut.

10. The limiting apparatus of claim 7, wherein the drive shafts drive respective flaps on opposite wings of an aircraft.

* * * * *